United States Patent [19]

Leitz et al.

[11] Patent Number: 4,908,422

[45] Date of Patent: Mar. 13, 1990

[54] THERMOPLASTIC MOLDING COMPOUNDS CONTAINING ALIPHATIC POLYCARBONATES

[75] Inventors: Edgar Leitz; Herbert Eichenauer, both of Dormagen; Karl-Heinz Ott, Leverkusen; Thomas Eckel, Dormagen; Horst Peters, Leverkusen; Jochen Schoeps, Krefeld, all of Fed. Rep. of Germany

[73] Assignee: Bayer Aktiengesellschaft, Leverkusen, Fed. Rep. of Germany

[21] Appl. No.: 318,966

[22] Filed: Mar. 6, 1989

[30] Foreign Application Priority Data

Mar. 17, 1988 [DE] Fed. Rep. of Germany ....... 3808840

[51] Int. Cl.$^4$ .............................................. C08L 69/00
[52] U.S. Cl. ....................................... 527/67; 525/68; 525/69; 525/468
[58] Field of Search ..................... 525/67, 68, 69, 468, 525/148; 528/372; 524/504

[56] References Cited

U.S. PATENT DOCUMENTS 4,560,725 12/1985 Van Bokhoven et al. ........... 525/67
4,749,755 6/1988 Buysch et al. ...................... 525/439
4,826,918 5/1989 Kress et al. ........................... 525/67

FOREIGN PATENT DOCUMENTS 0208107 1/1987 European Pat. Off. .
0236862 9/1987 European Pat. Off. .
0281837 9/1988 European Pat. Off. .

*Primary Examiner*—Theodore E. Pertilla
*Attorney, Agent, or Firm*—Connolly and Hutz

[57] ABSTRACT

The invention relates to thermoplastic molding compounds containing
  (1.) thermoplastic aromatic polycarbonates and/or thermoplastic aromatic polyesters,
  (2.) graft polymers and, optionally,
  (2.a) thermoplastic copolymers,
which are characterized in that they additionally contain aliphatic polycarbonates having weight average molecular weights $\overline{M}w$ (as measured by ultracentrifugation or light scattering) in the range from 15,000 to 500,000.

10 Claims, No Drawings

THERMOPLASTIC MOLDING COMPOUNDS CONTAINING ALIPHATIC POLYCARBONATES

This invention relates to thermoplastic molding compounds containing
 (1.) thermoplastic aromatic polycarbonates and/or thermoplastic aromatic polyesters,
 (2.) graft polymers and, optionally,
 (3.) thermoplastic copolymers,
which are characterized in that they additionally contain aliphatic polycarbonates having weight average molecular weights $\overline{M}_w$ (as measured by ultracentrifugation or light scattering) in the range from 15,000 to 500,000 and preferably in the range from 20,000 to 400,000.

Thermoplastic molding compounds of aromatic polycarbonate, graft polymer and, optionally, copolymers synthesized from vinyl compounds have long been known and are distinguished by a balanced property profile in regard to toughness and heat distortion temperature.

The flowability of the materials is often inadequate for the production of large, complicated parts involving long flow paths. The complete and rapid filling of the injection molds is in need of improvement in such cases.

Flow aids for the molding compounds mentioned are usually low molecular weight or oligomeric compounds. On account of their low molecular weight and their resulting volatility, they are often very difficult to incorporate at the high compounding temperatures necessary and, in the event of prolonged thermal stressing of the moldings, show a tendency towards "exudation".

In addition, aromatic polycarbonate/ABS molding compounds generally show only inadequate resistance to chemicals, particularly organic solvents and solvent mixtures, such as gasoline. Accordingly, the molding compounds can only be used with serious limitations for such applications as exterior bodywork parts for the automotive industry where resistance to fuels is absolutely essential.

It has now been found that the molding compounds according to the invention show high flowability, excellent solvent resistance and good toughness. In addition, moldings produced from the molding compounds according to the invention show high natural color quality. By virtue of the high molecular weight structure of the components, the molding compounds may readily be produced even at high compounding temperatures. "Exudation" or "fogging" of the components is suppressed.

Aliphatic polycarbonates suitable for use in accordance with the invention are preferably those corresponding to formula (I)

in which n is an integer of greater than 40, preferably from 40 to 4000 and more preferably from 50 to 3000.

$R^1$ in (I) is a linear $C_3$-$C_{12}$ alkylene radical or a radical corresponding to formulae (a) to (m) below:

—CH$_2$CH$_2$CH(CH$_3$)—      (a)

—CH$_2$CH$_2$OCH$_2$CH$_2$OCH$_2$CH$_2$—,      (b)

—CH$_2$CH(CH$_3$)CH$_2$CH$_2$C(CH$_3$)$_2$CH$_2$—,      (c)

 (d)

 (e)

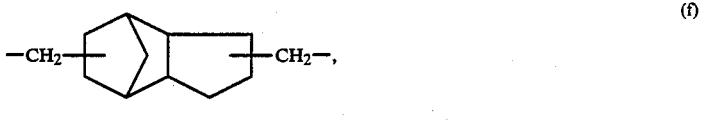 (f)

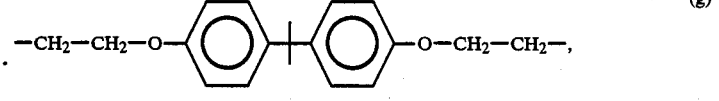 (g)

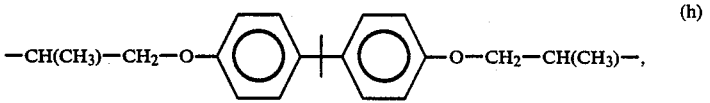 (h)

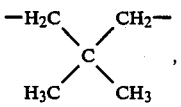 (i)

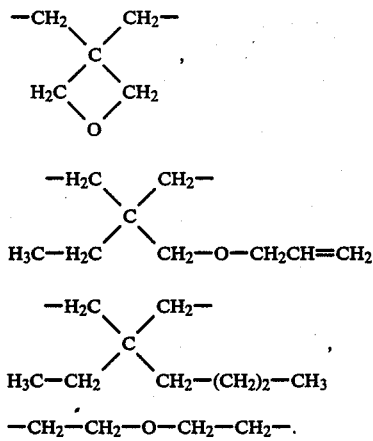

(j)

(k)

(l)

—CH$_2$—CH$_2$—O—CH$_2$—CH$_2$—.   (m)

The aliphatic polycarbonates may be produced by standard methods, for example by reaction or phosgenation of diols (DE-OS 20 01 091, FR-PS 13 91 512, DE-OS 10 31 512, DE-OS 24 46 107, DE-OS 26 05 024, EP 0 02 641, DE-OS 24 47 349) or, better still, by ring-opening mass and solution polymerization of cyclic aliphatic carbonates (cf. DE-OSS 15 45 116, 15 45 117, 31 03 135 and 32 04 078). They are preferably produced by the anionic ring-opening solution polymerization of cyclic aliphatic carbonates at low temperatures in accordance with EP-A-0 236 862 (Le A 24 435-EP).

Cyclic aliphatic carbonates for the production of the aliphatic polycarbonates to be used in accordance with the invention are compounds corresponding to formula (II):

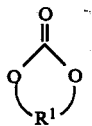   (II)

in which
R$^1$ has the meanings defined for formula (I) except for m, and compounds corresponding to formula (III)

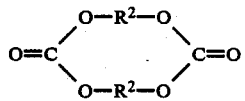   (III)

in which
R$^2$ is a linear C$_4$–C$_{12}$ alkylene radical or a radical corresponding to the following formulae (m) —CH$_2$CH$_2$OCH$_2$CH$_2$— or (b) CH$_2$CH$_2$OCH$_2$CH$_2$OCH$_2$CH$_2$—

Carbonates corresponding to formula (II) are preferably used for the production of the aliphatic polycarbonates to be used in accordance with the invention. The carbonate in which R$^1$ is

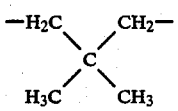

is particularly preferred.

Thermoplastic aromatic polycarbonates of component (1) suitable for use in accordance with the invention are those based on diphenols corresponding to formula (IV)

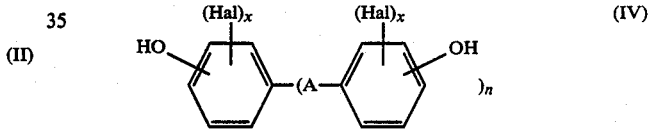   (IV)

in which
A is a single bond, C$_1$–C$_5$ alkylene, C$_2$–C$_5$ alkylidene, a C$_5$–C$_6$ cycloalkylidene, —S—, —SO$_2$— or a radical

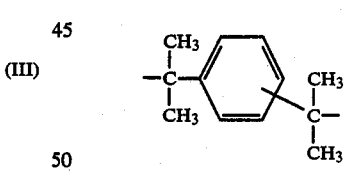

Hal is chlorine or bromine,
x=0, 1 or 2 and
n=1 or 0,
and, optionally, to formula (V)

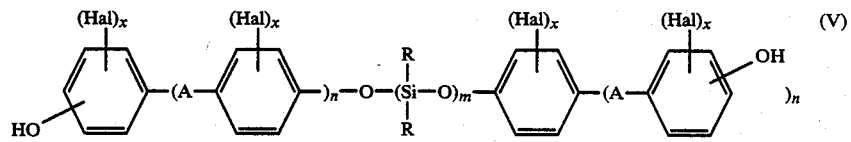   (V)

in which
A, Hal, x and n are as defined for formula (IV) the substituents R may be the same or different and represent linear C$_1$–C$_{10}$ alkyl, branched C$_3$–C$_{20}$ alkyl, C$_6$–C$_{20}$ aryl, preferably CH$_3$, and m is an integer of from 5 to 100 and preferably from 20 to 80.

The diphenols corresponding to formula (IV) are known or may be obtained by known methods; hydroxyaryloxy-terminated polydiorganosiloxanes corresponding to formula (V) are also known (cf. US-PS 3,419,634) or may be prepared by known methods.

Suitable diphenols corresponding to formula (IV) are hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-sulfones and α,α'-bis-(hydroxyphenyl)-diisopropylbenzenes and nucleus-chlorinated and nucleus-brominated derivatives thereof.

Examples of suitable diphenols corresponding to formula (IV) are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane and 2,2-bis-(3,5-dibromo-4-hydroxyphenyl)-propane.

Preferred diphenols corresponding to formula (IV) are 2,2-bis-(4-hydroxyphenyl)-propane, 2,2-bis-(3,5-dichloro-4-hydroxyphenyl)-propane, 2,2-bis-(3,5-dibromo-4-hydroxyphenyl)propane and 1,1-bis-(4-hydroxyphenyl)-cyclohexane.

Particularly suitable diphenols corresponding to formula (V) are those in which R is methyl, ethyl, propyl, n-butyl, tert.-butyl or phenyl, more especially those corresponding to formula (IV)

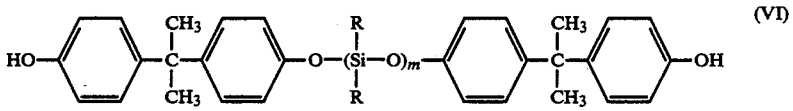
(VI)

in which the substituents R are the same and have the meanings defined above and m is an integer of 5 to 100 and preferably of 20 to 80.

The diphenols corresponding to formula (V) may be prepared, for example, from the corresponding bis-chlorine compounds corresponding to formula (VII)

(VII)

and the diphenols (IV), for example in accordance with US-PS 3,419,635, column 3, in combination with US-PS 3,189,662.

In the bis-chlorine compounds (VII), R and m have the same meanings as in the diphenols (V) and (VI).

Polycarbonates of component (1.) suitable for use in accordance with the invention are homopolycarbonates of a diphenol and copolycarbonates of several diphenols, the diphenols of formula (V) only being used for the preparation of copolycarbonates with the diphenols of formula (IV) in a quantity by weight of 1 to 50% by weight, preferably 1.5 to 25% by weight and more preferably 2 to 10% by weight, based on the total weight of the diphenols of formulae (IV) and (V) used.

Polycarbonates of component (1.) suitable for use in accordance with the invention are also mixtures of a copolycarbonate of the diphenols of formulae (V) and (IV) and another siloxane-free thermoplastic polycarbonate, the content of diphenols corresponding to formula (V) in the polycarbonate mixture, based on the total sum of diphenols, again being from 1 to 50% by weight.

In addition to bisphenol-A-homopolycarbonate, preferred polycarbonates are the copolycarbonates of bisphenol A with up to 15 mol-%, based on the mol total of diphenols, of 2,2-bis-(3,5-dibromo-4-hydroxyphenyl)-propane and the copolycarbonates of the diphenols of formula (IV) with 1 to 50% by weight of diphenols corresponding to formula (V) and preferably to formula (VI), based in each case on the total weight of the diphenols (IV) and (V) or (IV) and (VI).

The polycarbonates of component (1.) suitable for use in accordance with the invention may be branched in known manner, preferably by the incorporation of 0.05 to 2.0 mol-%, based on the sum of diphenols used, of trifunctional or more than trifunctional compounds, for example those containing three or more than three phenolic groups.

The production of the polycarbonates of component (1.) suitable for use in accordance with the invention is known and may be carried out, for example, with phosgene by the interfacial process or with phosgene by the homogeneous phase process ("pyridine process"). Molecular weight may be regulated by a corresponding quantity of chain terminators (for polycarbonates containing polydiorganosiloxanes, see DE-OS 33 34 872 (Le A 22 594)).

The polycarbonates of component (1.) suitable for use in accordance with the invention have average weight average molecular weights (M$_w$, as measured by ultracentrifugation or scattered light measurement) in the range from 10,000 to 200,000 and preferably in the range from 20,000 to 80,000.

Suitable chain terminators for regulating the molecular weights of the polycarbonates of component (1.) are, for example, phenol, p-chlorophenol, p-tert.-butylphenol, 2,4,6-tribromophenol, long-chain alkylphenols, such as 4-(1,3-tetramethylbutyl)-phenol (DE-OS 28 42 005), monoalkylphenols and dialkylphenols containing a total of 8 to 20 C atoms in the alkyl substituents, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)phenol (DE-OS 35 06 472).

The quantity of chain terminator comprises 0.1 to 10 mol-%, based—in the case of the phenolic chain terminators—on mols diphenols and—in the case of monocarboxylic acid chloride chain terminators—on mols dicarboxylic acid dichlorides.

Thermoplastic, aromatic polyesters of component (1.) suitable for use in accordance with the invention are thermoplastic, aromatic polyester (carbonates) based on C$_6$–C$_{30}$ diphenols, aromatic C$_8$–C$_{14}$ dicarboxylic acids, chain terminators and, optionally, carbonic acid halides and/or branching agents.

Accordingly, polyester (carbonates) in the context of the present invention are aromatic, optionally branched polyesters which, in addition, may contain carbonate bonds, the carbonate bonds in the polycondensate chain amounting to at most 99 mol-%, preferably to 80 mol-% and more preferably to 50 mol-%, based on the total mols of ester and carbonate bonds in the polycondensate chain, and the ester bonds thus amounting to at least 1 mol-%, preferably to 20 mol-% and more preferably to 50 mol-%, based on the total mols of ester and carbonate bonds in the polycondensate chain.

Suitable $C_6$-$C_{30}$ diphenols are those of formula (IV) mentioned for the polycarbonates.

Preferred $C_6$-$C_{30}$ diphenols are again the preferred types of formula (IV).

Suitable aromatic dicarboxylic acids are, for example, isophthalic acid, terephthalic acid, diphenylether-4,4'-dicarboxylic acid and naphthalene-2,6-dicarboxylic acid.

Preferred aromatic dicarboxylic acids are isophthalic acid, terephthalic acid and mixtures thereof in a ratio of 1:20 to 20:1.

The dicarboxylic acids are incorporated in the polyesters or in the polyester carbonates in the form of dicarboxylic acid dichlorides.

Suitable chain terminators are the phenolic types already mentioned for the production of the polycarbonates. Chlorocarbonic acid esters of these phenolic chain terminators are also suitable. Other suitable chain terminators are acid chlorides of aromatic monocarboxylic acids, for example benzoyl chloride. Other suitable chain terminators are acid chlorides of aliphatic $C_2$-$C_{22}$ acetyl chloride.

The quantity of chain terminator to be used amounts to between 0.1 and 10 mol-%, the quantity being based on mols diphenols in the case of phenolic chain terminators and on mols dicarboxylic acid dichlorides in the case of acid chloride chain terminators.

The preferred carbonic acid halide is $COCl_2$.

Possible branching agents are mentioned in DE-OS 29 40 024 and 30 07 934.

The production both of the polyesters suitable for use in accordance with the invention and of the polyester carbonates suitable for use in accordance with the invention is known (cf. for example DE-OS 29 40 024 (Le A 19 932) and DE-OS 30 07 934 (Le A 21 203) and DE-OSS 22 32 877, 27 03 376, 30 00 610 and 27 14 544 and DE-AS 14 95 626). The interfacial process is particularly preferred.

Up to 30 mol-% of the dicarboxylic acids and dihydroxy compounds ... aliphatic units, for example adipic acid, butane-1,4-diol, may also be involved in the synthesis of the polyester (carbonates) of component (1.) suitable for use in accordance with the invention.

The polyester (carbonates) of component (1.) suitable for use in accordance with the invention may also contain aromatic hydroxycarboxylic acids, i.e. for example p-hydroxybenzoic acid, which may be incorporated in known manner taking the diphenol and dicarboxylic acid units into account. Accordingly, 1 mol aromatic hydroxycarboxylic acid replaces ½ mol dicarboxylic acid and ½ mol diphenol.

The ester groups and carbonate groups may be statistically distributed or even arranged in blocks in the polyester carbonates of component (1.).

The thermoplastic aromatic polyesters of component (1.) suitable for use in accordance with the invention have relative solution viscosities ($\eta_{rel}$) in the range from 1.18 to 1.4 and preferably in the range from 1.22 to 1.3 (as measured on solutions of 0.5 g polyester in 100 ml $CH_3Cl_2$ solution at 25° C.).

Graft polymers of component (2.) suitable for use in accordance with the invention may be obtained by grafting of (2.1.) 5 to 90 parts by weight and preferably 30 to 80 parts by weight of a mixture of (2.1.1.) 50 to 95 parts by weight styrene, α-methylstyrene, nucleus-substituted styrene, methyl methacrylate or mixtures thereof and (2.1.2.) 50 to 5 parts by weight acrylonitrile, methacrylonitrile, methyl methacrylate, maleic anhydride, N-substituted maleic imide or mixtures thereof onto (2.2.) 95 to 10 parts by weight and preferably 70 to 20 parts by weight of a rubber having a glass temperature $T_G$ of $\leq 10°$ C.

Rubbers suitable for the production of the graft polymers (2.) are, in particular, polybutadiene, butadiene/styrene copolymers with up to 30% by weight, based on rubber, of a lower alkyl ester of acrylic or methacrylic acid (for example methyl methacrylate, ethyl acrylate, methacrylate or ethyl methacrylate), polyisoprene, polychloroprene, alkyl acrylate rubbers based on $C_1$-$C_8$ alkyl acrylates, particularly ethyl, butyl, ethylhexyl acrylate. The alkyl acrylate rubbers may optionally contain up to 30% by weight, based on rubber, of monomers, such as vinyl acetate, acrylonitrile, styrene, methyl methacrylate and/or vinyl ethers in copolymerized form. They may contain relatively small quantities, preferably up to 5% by weight, based on rubber, of crosslinking ethylenically unsaturated monomers in copolymerized form.

Crosslinking agents of the type in question are, for example, alkylenediol di(meth)acrylates, polyester di(-meth)acrylates, divinylbenzene, trivinylbenzene, triallyl cyanurate, allyl(meth)acrylate, butadiene and isoprene. Other suitable acrylate rubbers are products which contain a crosslinked diene rubber of one or more conjugated dienes, such as polybutadiene, or a copolymer of a conjugated diene with an ethylenically unsaturated monomer, such as styrene and/or acrylonitrile, as nucleus and an acrylate rubber shell. Other suitable rubbers are, for example, EPDM rubbers, i.e. rubbers of ethylene, propylene and an unconjugated diene monomer, and silicone rubbers.

Preferred rubbers for the production of the graft polymers (2.) are diene, alkyl acrylate and silicone rubbers.

The rubbers are present in the graft polymer (2.) in the form of at least partly crosslinked particles having an average diameter of 0.09 to 5 μm and more especially 0.1 to 1 μm. The graft polymers (2.) may be prepared by radical graft polymerization of the monomer mixtures (2.1.) defined above in the presence of the rubbers (2.2.) to be grafted. Preferred production processes for the graft polymers (2.) are emulsion, solution, mass or suspension polymerization. Particularly preferred graft polymers (2.) are ABS graft polymers. Halostyrenes and p-methylstyrene are mentioned as nucleus-substituted styrenes.

Thermoplastic copolymers of component (2a) suitable for use in accordance with the invention may be obtained by copolymerization of (2a.1.) 50 to 95 parts by weight styrene, α-methylstyrene, nucleus-substituted styrene, methyl methacrylate or mixture thereof with (2a.2.) 50 to 5 parts by weight acrylonitrile, methacrylonitrile, methyl methacrylate, N-substituted maleic imide or mixtures thereof.

Preferred copolymers (2a) are those of at least one of the monomers styrene, α-methylstyrene, nucleus-substituted styrene according to (2a.1.) with at least one of the monomers acrylonitrile, methacrylonitrile, methyl methacrylate, maleic anhydride, N-substituted maleic imide according to (2a.2.).

The parts by weight of components (1), (2), (3) and (2a) in the thermoplastic molding compounds according to the invention are 15 to 97.5 parts by weight and preferably 35 to 90 parts by weight for component (1), 2 to 50 parts by weight and preferably 5 to 35 parts by weight for component (2), 0.5 to 45 parts by weight, preferably 1 to 35 parts by weight and more preferably 1.5 to 22 parts by weight for component (3) and 0 to 50 parts by weight and preferably 0 to 30 parts by weight for component (2a), the sum of the parts by weight of components (1.), (2.), (3.) and, optionally, (2.a.) being 100.

Copolymers (2.a.) are often formed as secondary products in the graft polymerization for the production of component (2), particularly when large quantities of monomer are grafted onto small quantities of rubber.

The quantity of copolymer (2a) to be used in accordance with the invention, namely 0 to 50 parts by weight, based on 100 parts by weight of the mixture of 1.+2.+2a.+3., does not include these secondary products of the graft polymerization.

The copolymers (2.a.) are resin-like, thermoplastic and rubber-free. Particularly preferred copolymers (2.a.) are those of styrene and/or α-methylstyrene with acrylonitrile and, optionally, with methyl methacrylate.

Particularly preferred ratios by weight in the thermoplastic copolymer (2.a.) are 60 to 80% by weight (2.a.1.) and 40 to 20% by weight (2.a.2.).

The copolymers (2.a.) may be prepared by radical polymerization, more especially by emulsion, suspension, solution or mass polymerization. They preferably have molecular weights $M_w$ (weight averages, as determined by light scattering or sedimentation) of from 15,000 to 200,000.

The molding compounds according to the invention may contain other known additives for polycarbonates or graft polymers and copolymers such as stabilizers, pigments, mold release agents, flameproofing agents and/or antistatic agents, in the usual quantities.

The molding compounds according to the invention containing components (1), (2), the aliphatic polycarbonate component (3) and, optionally, component (2a) and/or other additives may be prepared by mixing their constituents in known manner and melt-compounding or melt-extruding the resulting mixtures at temperatures of 200° to 330° C. in standard mixing units, such as internal kneaders, extruders or twin-screw extruders.

Accordingly, the present invention also relates to a process for the production of thermoplastic molding compounds containing components (1), (2), the aliphatic polycarbonate component (3) and, optionally, component (2.a), stabilizers, pigments, mold release agents, flameproofing agents and/or antistatic agents, characterized in that components (1), (2), (3) and, optionally, component (2.a), stabilizers, pigments, mold release agents, flameproofing agents and/or antistatic agents are mixed in known manner and the resulting mixture is then melt-compounded or melt-extruded in standard mixing units at temperatures in the range from 200° to 330° C.

The constituents may be mixed in known manner both gradually and also simultaneously both at around 20° C. (room temperature) and at higher temperatures.

The molding compounds according to the invention may be used for the production of moldings of all kinds. In particular, moldings may be produced by injection molding. Examples of moldings which can be produced from the molding compounds according to the invention include housing components for domestic appliances, moldings for the interior of motor vehicles and, more particularly, for the exterior of motor vehicles.

Another form of processing is the production of moldings by deep drawing from prefabricated sheets or films.

Particle size always means average particle diameters $d_{50}$, as determined by ultracentrifuge measurements in accordance with W. Scholtan et al., Kolloid-Z and Z-Polymere 250 (1972), 782–796.

EXAMPLES

Polycondensates and polymers used, compounds A representing component (1), compounds B component (2), compound C component (2.a.) and compounds D component (3).

A.1

Polycarbonate based on bisphenol A, relative solution viscosity $\eta_{rel}$ 1.26 to 1.28, as measured in $CH_2Cl_2$ at 25° C. and at a concentration of 0.5 g/100 ml.

A.2

Polyester carbonate, ester content 50 mol-%, based on bisphenol A, isophthalic and terephthalic acid (1:1), relative solution viscosity $\eta_{rel}$ 1.30, as measured in $CH_2Cl_2$ at 25° C. and at a concentration of 0.5 g/100 ml.

B.1

SAN graft polymer of 50% by weight styrene/acrylonitrile mixture (ratio by weight 72:28) on 50% by weight particulate polybutadiene having an average particle diameter ($d_{50}$) of 0.4 μm obtained by emulsion polymerization.

B.2

SAN graft polymer of 50% by weight styrene/acrylonitrile mixture (ratio by weight 72:28) on 50% by weight particulate polysiloxane having an average particle diameter ($d_{50}$) of 0.3 μm obtained by emulsion polymerization.

C.

Styrene/acrylonitrile copolymer (styrene-to-acrylonitrile ratio 72:28), intrinsic viscosity $[\eta] = 0.55$ dl/g, as measured in dimethylformamide at 20° C.

D.1

Aliphatic polycarbonate based on neopentyl alcohol (2,2-dimethylpropane-1,3-diol) obtained by ring-opening anionic polymerization of neopentyl glycol carbonate; relative solution viscosity $\eta_{rel}$ 2.55 (2% by weight solution in $CH_2Cl_2$ at 20° C.); $\overline{M}w = 100,000$ g/mol.

D.2

Aliphatic polycarbonate based on neopentyl alcohol (2,2-dimethylpropane-1,3-diol) obtained by ring-opening anionic polymerization of neopentyl glycol carbonate; relative solution viscosity $\eta_{rel}$ 3.4 (2% by weight solution in $CH_2Cl_2$ at 20° C.); $\overline{M}w = 150,000$ g/mol.

D.3

Aliphatic polycarbonate based on neopentyl alcohol (2,2-dimethylpropane-1,3-diol) obtained by ring-opening anionic polymerization of neopentyl glycol carbonate; relative solution viscosity $\eta_{rel}$ 2.37 (2% by weight solution in $CH_2Cl_2$ at 20° C.); $\overline{M}w=95,000$ g/mol.

D.4

Aliphatic polycarbonate based on neopentyl alcohol (2,2-dimethylpropane-1,3-diol) obtained by ring-opening anionic polymerization of neopentyl glycol carbonate; relative solution viscosity $\eta_{rel}$ 4.55 (2% by weight solution in $CH_2Cl_2$) at 20° C.; $\overline{M}w=210,000$ g/mol.

E.

Phosphorous acid ester of bis(2-hydroxy-3-cyclohexyl-5-methylphenyl)-methane as stabilizer.

The molecular weights ($\overline{M}w$) of components D were determined by gel permeation chromatography on the basis of a calibration curve for polyneopentyl glycol carbonate.

The components were compounded in a 1.3 liter internal kneader.

The moldings were made in an injection molding machine at 260° C. and 280° C.

The Izod notched impact strength $a_k$ was measured on bars measuring 80×10×4 mm in accordance with ISO 180 1 A at the temperatures shown in the Examples.

Flowability was measured from the filling pressure (cf. Johannaber, Kunststoffe 74 (1984, 1; pages 1-5) required in the injection molding machine used (melt temperature 260° C., 280° C.) to produce bars measuring 80×10×4 mm.

Stress cracking behavior was investigated using bars measuring 80×10×4 mm (melt temperature 260° C.). A mixture of 50% toluene and 50% isooctane was used as simulated fuel. The test specimens were pre-extended using an arcuate template and stored for 5 minutes at room temperature in the simulated fuel. The pre-extension $\epsilon_x$ measured 0.2 to 2.4%. Stress cracking behavior was evaluated from the cracks formed or from the fracture as a function of the pre-extension.

The composition of the tested materials and the data obtained are shown in the following Tables:

TABLE 1

|  | Examples according to the invention (parts by weight) | | | Comparison Example (parts by weight) |
|---|---|---|---|---|
|  | 1 | 2 | 3 | 4 |
| Components |  |  |  |  |
| A.1 | 67.2 | 65.6 | 64 | 68 |
| A.2 | 16.8 | 16.4 | 16 | 17 |
| B.2 | 15 | 15 | 15 | 15 |
| D.1 | 1 | 3 | 5 | — |
| Tests |  |  |  |  |
| Toughness $a_K$ |  |  |  |  |
| $a_k$ (RT) (kJ/m²) | 47 | 47 | 46 | 46 |
| $a_k$ (−40° C.) (kJ/m²) | 39 | 40 | 36 | 41 |
| (melt temperature 280° C.) |  |  |  |  |
| Filling pressure (bar) at 280° C. | 427 | 390 | 307 | 446 |
| Stress cracking behavior EC/UC* on pre-extension $\epsilon_x$ (%) | 0.4 | 0.75 | 1.19 | 0.4 |
| Fracture on pre-extension ehd x (%) | 0.7 | 1.0 | 2.0 | 0.6 |

*EC/UC: edge/upper cracks

TABLE 2

|  | Example according to the invention (parts by weight) 5 | Comparison Example (parts by weight) 6 |
|---|---|---|
| Components |  |  |
| A.1 | 60 | 60 |
| B.1 | 24 | 24 |
| C. | 16 | 16 |
| D.2 | 2 | — |
| E. | 0.25 | 0.25 |
| Tests |  |  |
| Notched impact strength $a_K$ $a_K$ (RT) (kJ/m²) | 55 | 54 |
| $a_K$ (−30° C.) (kJ/m²) (melt temperature 260° C.) |  |  |
| Filling pressure (bar) at 260° C. | 80 | 102 |

TABLE 3

|  | Examples according to the invention (parts by weight) | | | Comparison Example (parts by weight) |
|---|---|---|---|---|
|  | 7 | 8 | 9 | 10 |
| Components |  |  |  |  |
| A.1 | 60 | 60 | 60 | 60 |
| B.1 | 25 | 25 | 25 | 25 |
| C. | 10 | 5 | — | 15 |
| D.3 | 5 | 10 | 15 | — |
| E. | 0.25 | 0.25 | 0.25 | 0.25 |
| Tests |  |  |  |  |
| Notched impact strength $a_K$ $a_k$ (RT) (kJ/m²) (melt temperature 260° C.) | 47 | 50 | 44 | 47 |
| Filling pressure (bar) at 260° C. | 60 | 49 | 45 | 75 |
| Stress cracking behavior EC/UC* on pre-extension $\epsilon_x$ (%) | 0.6 | 1.2 | 2.0 | 0.6 |
| Fracture on pre-extension $\epsilon_x$ (%) | 1.2 | — | — | 0.7 |
| No fracture on pre-extension $\epsilon_x$ (%) | — | 2.4 | 2.4 | — |

*EC/UC: edge/upper cracks

TABLE 4

|  | Examples according to the invention (parts by weight) | | | Comparison Example (parts by weight) |
|---|---|---|---|---|
|  | 11 | 12 | 13 | 14 |
| Components |  |  |  |  |
| A.1 | 85 | 80 | 67.5 | 90 |
| B.1 | 10 | 10 | 10 | 10 |
| D.4 | 5 | 10 | 22.5 | — |
| E. | 0.25 | 0.25 | 0.25 | 0.25 |
| Tests |  |  |  |  |
| Notched impact strength $a_K$ $a_K$ (RT) (kJ/m²) (melt temperature 260° C.) | 65 | 63 | 29 | 63 |
| Filling pressure (bar) at 260° C. | 155 | 111 | 70 | 171 |
| Stress cracking behavior EC/UC* on pre-extension $\epsilon_x$ (%) | 0.4 | 0.4 | — | — |
| Fracture on pre-extension $\epsilon_x$ (%) | 0.6 | 0.7 | — | 0.2 |
| No fracture on pre-extension $\epsilon_x$ (%) | — | — | 2.4 | — |

*EC/UC: edge/upper cracks

We claim:

1. Thermoplastic molding compounds containing (1.) thermoplastic aromatic polycarbonates, thermoplastic aromatic polyesters or mixtures thereof,
(2.) graft polymers obtained by grafting of
(2.1.) 5 to 90 parts by weight of a mixture of
(2.1.1.) 50 to 95 parts by weight styrene, α-methylstyrene, nucleus-substituted styrene, methyl methacrylate or mixtures thereof and
(2.1.2.) 50 to 5 parts by weight acrylonitrile, methacrylonitrile, methyl methacrylate, maleic anhydride, N-substituted maleic imide or mixtures thereof onto
(2.2.) 95 to 10 parts by weight of a rubber having a glass temperature $T_G$ of <10° C., and, optionally,
(2.a) thermoplastic copolymers obtained by copolymerization of
(2.a.1.) 50 to 95 parts by weight styrene, α-methylstyrene, nucleus-substituted styrene, methyl methacrylate or mixtures thereof with
(2.a.2.) 50 to 5 parts by weight acrylonitrile, methacrylonitrile, methyl methacrylate, N-substituted maleic imide or mixtures thereof,
characterized in they additionally contain aliphatic polycarbonates having weight average molecular weights Mw (as measured by ultracentrifugation or light scattering) in the range from 15,000 to 500,000.

2. Molding compounds as claimed in claim 1, characterized in that the aliphatic polycarbonates have weight average molecular weights $\overline{M}w$ in the range from 20,000 to 400,000.

3. Thermoplastic molding compounds as claimed in claim 1, characterized in that the aliphatic polycarbonates have the formula (I)

in which n is an integer of greater than 40 and $R^1$ is a linear $C_3$-$C_{12}$ alkylene radical or a radical having a formula selected from (a) to (m) below

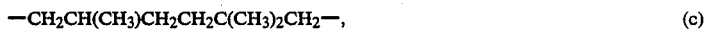

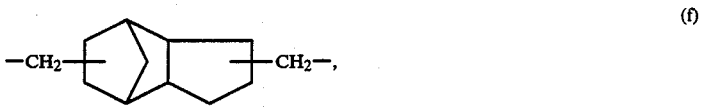

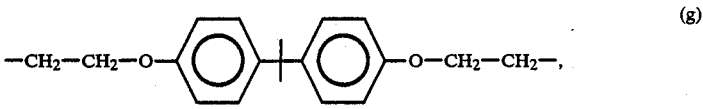

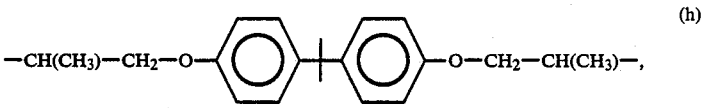

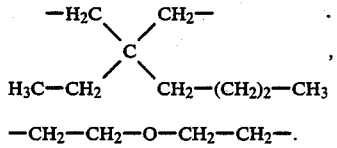

(l)

—CH$_2$—CH$_2$—O—CH$_2$—CH$_2$—.  (m)

4. Molding compounds as claimed in claim 1, characterized in that the aliphatic polycarbonates are present in quantities of from 0.5 to 45 parts by weight, based on 100 parts by weight of the molding compound consisting of components (1)+(2)+aliphatic polycarbonates and, optionally, component (2a).

5. Molding compounds as claimed in claim 4, characterized in that the aliphatic polycarbonates are present in quantities of from 1 to 35 parts by weight.

6. Molding compounds as claimed in claim 5, characterized in that the aliphatic polycarbonates are present in quantities of from 1.5 to 30 parts by weight.

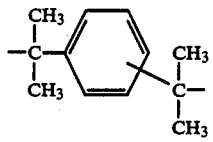

Hal is chlorine or bromine,
x=0, 1 or 2 and
n=1 or 0
and, optionally, to formula (V)

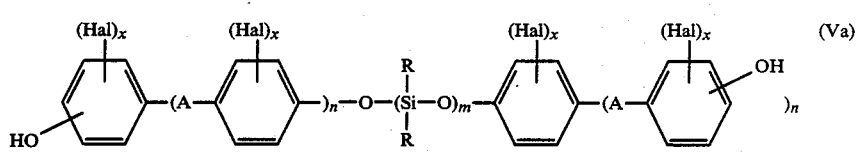

in which
A, Hal, x and n have the meanings defined for formula (IV), the substituents R are the same or different and represent linear $C_1$-$C_{10}$ alkyl, branched $C_3$-$C_{20}$ alkyl, $C_6$-$C_{20}$ aryl and m is an integer of from 5 to 100.

7. Molding compounds as claimed in claim 1, characterized in that component (1.) is a thermoplastic polycarbonate based on diphenols having the formula (IV)

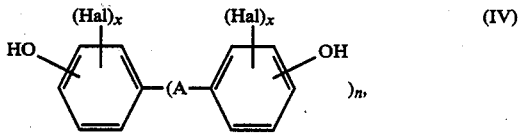

in which
A is a single bond, $C_1$-$C_5$ alkylene, $C_2$-$C_5$ alkylidene, a $C_5$-$C_6$ cycloalkylidene, —S—, —SO$_2$— or a radical 8. Molding compounds as claimed in claim 1, characterized in that component (1) is a thermoplastic aromatic polyester based on $C_6$-$C_{30}$ diphenols, aromatic $C_8$-$C_{14}$ dicarboxylic acids, chain terminators and, optionally, carbonic acid halides, branching agents or mixtures thereof.

9. Molding compounds as claimed in claim 8, characterized in that component (1) is a thermoplastic aromatic polyester carbonate.

10. Molding compounds as claimed in claim 1, characterized in that they additionally contain stabilizers, pigments, mold release agents, flameproofing agents, antistatic agents or mixtures thereof.

* * * * *

UNITED STATES PATENT AND TRADEMARK OFFICE
CERTIFICATE OF CORRECTION

PATENT NO. : 4,908,422
DATED : March 13, 1990
INVENTOR(S) : LEITZ ET AL

It is certified that error appears in the above-identified patent and that said Letters Patent is hereby corrected as shown below:

Col. 12, lines 13-15 should read as follows:

--Notched impact strength $a_K$

| | | |
|---|---|---|
| $a_K$ (RT) (kJ/m$^2$) | 55 | 54 |
| $a_K$ (-30°C.) (kJ/m$^2$) | 54 | 45--. |

Signed and Sealed this

Twenty-first Day of May, 1991

Attest:

HARRY F. MANBECK, JR.

*Attesting Officer*  *Commissioner of Patents and Trademarks*